(12) United States Patent
Carrie et al.

(10) Patent No.: US 6,485,027 B1
(45) Date of Patent: Nov. 26, 2002

(54) SURFACE HEAT TREATMENT OF PISTON RINGS

(75) Inventors: Olivier Carrie, Chantilly (FR); Jean-Marc Staerck, Lipsheim (FR); Christophe Maerky, Saint-Quen 1'Aumone (FR); Olivier Laine, Plaisir (FR)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/240,106

(22) Filed: Jan. 29, 1999

(51) Int. Cl.$^7$ ............... C21D 9/40; F16J 9/00
(52) U.S. Cl. ........... 277/440; 277/442; 277/443; 277/444; 29/888.3
(58) Field of Search ................ 277/430, 440, 277/442; 148/902, 660, 662; 29/888.3

(56) References Cited

U.S. PATENT DOCUMENTS

| | | | |
|---|---|---|---|
| 2,177,700 A | * 10/1939 | Fisher | |
| 4,025,366 A | * 5/1977 | Ruf et al. | |
| 4,247,972 A | * 2/1981 | Hendrixon et al. | 29/156.63 |
| 4,336,077 A | 6/1982 | Leach et al. | |
| 4,344,634 A | * 8/1982 | Onozaki | 277/236 |
| 4,407,515 A | * 10/1983 | Naito | 277/139 |
| 4,497,102 A | * 2/1985 | Ikutake | 29/156.63 |
| 4,547,336 A | 10/1985 | Mahrus et al. | |
| 4,612,260 A | * 9/1986 | Kumagai et al. | 277/235 |
| 4,817,578 A | 4/1989 | Ushio et al. | |
| 5,154,433 A | * 10/1992 | Naruse | 277/235 |
| 5,718,437 A | 2/1998 | Tanaka et al. | |
| 5,773,734 A | * 6/1998 | Young | 75/243 |
| 5,840,136 A | * 11/1998 | Maruki et al. | 148/664 |
| 5,985,052 A | * 11/1999 | Angilella et al. | |
| 6,131,503 A | * 10/2000 | Takashima | |

FOREIGN PATENT DOCUMENTS

| | | | |
|---|---|---|---|
| DE | 2852641 | * 12/1980 | |
| JP | 355001408 A | * 1/1980 | F02F/5/00 |
| JP | 363038766 A | * 2/1988 | |

OTHER PUBLICATIONS

J. M. Camp and C. B. Francis, "The Making, Shaping and Treating of Steel", Copyright 1925 and pp. 678 to 689.*

* cited by examiner

Primary Examiner—Anthony Knight
Assistant Examiner—Vishal Patel
(74) Attorney, Agent, or Firm—Rader, Fishman & Grauer PLLC

(57) ABSTRACT

A piston ring for use in a piston of an internal combustion engine comprises a base material of a first hardness formed into a ring, and a secondary material of a second hardness formed by selective and superficial heat treatment of an outer portion of the base material. At least one outer surface of the ring is selectively and superficially heat treated in one of a variety of ways to form an austenitic metal layer about 100 $\mu$m thick on the surface of the ring. The ring is then rapidly cooled in an appropriate environment, resulting in the transformation of the austenitic compound into a martensitic compound adjacent the base material at the point of heat treatment. Preferably, the martensitic metal has a hardness range of 800 to 1000 HV (Vickers Hardness scale) measured at a load of 100 grams.

23 Claims, 2 Drawing Sheets

SURFACE HEAT TREATMENT OF PISTON RINGS

The present invention relates to a piston ring, and more particularly, to a piston ring formed of a base material having an outer layer that is first selectively subjected to localized and superficial heating such that the outer layer is transformed to an austenitic form, and second to a rapid cooling such that said austenitic form is converted to a martensitic form.

BACKGROUND OF THE INVENTION

Piston rings are well known. They are usually received within an annular groove disposed about an outer periphery of a piston. In turn, the piston is reciprocated within a cylinder of an internal combustion engine. Typically, the piston ring is discontinuous, having two end portions. The end portions are separated from one another to expand the piston ring for insertion into a corresponding groove of the piston. The piston ring is then compressed, bringing the end portions closer together, to install the piston within the cylinder.

A piston compresses fluids such as gases within the cylinder. In an internal combustion engine, these fluids are ignited and expand, forcing the piston away from the point of ignition. The outer surface or bearing face of a piston ring in an internal combustion engine is subjected to high temperatures, corrosion, and frictional interaction with the walls of the cylinder.

To improve durability, wear and scuff resistance, it is known to use a variety of wear surface materials bonded to an underlying substrate forming the core of the piston ring. Examples include wear surface materials comprising ceramics, nickel-boron face coatings and various nitride coatings such as chromium nitride coating. These wear materials have a number of limitations. First, they are extremely brittle and subject to cracking or other unacceptable failure modes. Second, there is often a problem with achieving a sufficient coating thickness such that the coating does not prematurely wear away and expose the base material, thereby possibly resulting in piston ring failure. Third, it is extremely difficult to machine a piston ring having a known wear material already bonded to the base material. Fourth, piston rings with known wear materials are often heavier, increasing inertial force and friction within the cylinder. Finally, known piston rings with wear materials bonded to a base material are typically fairly expensive to manufacture.

Another way to improve durability, wear and scuff resistance of piston rings is to form the piston ring from a base material having a first hardness, and then subject the base material to a heat treatment, thereby hardening the base material. Typically, piston rings of this type are formed from powdered, austenitic iron, and are then subjected to a form of heat treatment to form martensitic iron in at least a portion of the piston ring. However, austenitic iron is difficult to work with, and forming piston rings from powdered austenitic iron may create undesirable manufacturing defects within the piston ring. Moreover, the entire piston ring is subjected to a heat treatment, requiring sufficient time and heat treatment to affect substantially all of the piston ring.

SUMMARY OF THE INVENTION

The present invention is directed to a piston ring for use in a piston of an internal combustion engine. The ring includes a base material of a first hardness formed into a ring, and a secondary material of a second hardness formed by selective and superficial heat treatment of an outer portion of said base material. The heat treatment may be selectively and superficially limited to only the face and contact areas of the piston ring, or may involve the entire surface of the piston ring.

In a first embodiment, the ring is formed from cast iron, iron-aluminum alloys or steel alloys. At least a portion of the outer surface of the ring is selectively and superficially heat treated in one of a variety of ways to form an austenitic metal layer about 25–200 $\mu$m, and most preferably 100 $\mu$m thick on a surface of the ring. The ring is then rapidly cooled in an appropriate environment, resulting in the transformation of the austenitic compound into a fine martensitic compound adjacent the base material at the point of heat treatment. Preferably, the martensitic metal has a hardness range of 800 to 1000 HV (Vickers Hardness scale) measured at a load of 100 grams. In a second embodiment, the base material is a quenched and tempered alloy that includes coarse martensite. The heating of a portion of the surface of the base material causes a transition to austenite, and the subsequent rapid quenching transforms the austenite into a fine martensite that is harder than the original base material.

Several methods may be used to heat the surface of the piston ring. In one method, electrons emitted by a cathode are accelerated and concentrated onto an outer surface of the piston ring while it is in a high vacuum environment. As the electrons interact with the surface of the ring, energy is transferred to the surface of the ring, thereby heating the surface of the ring. In this way, the electron beam heats the surface of the ring beyond the temperature of austenite formation.

In another method, the surface of the ring is heated by focusing a laser upon the surface of the ring such that the temperature of the surface of the ring exceeds the temperature of austenitic iron formation. In other methods, the surface of the ring is heated by an induction furnace or by exposure to a plasma torch.

In all cases, the base material comprising the piston ring is relatively ductile and workable, selected from the group comprising cast iron, aluminum-iron alloys or steel alloys. The base material must be able to transition to both an austenitic form and a martensitic form having the desired end characteristics described below. In a first embodiment, the base material has not been hardened or pre-treated in any way, and need not include any austenite. In a further embodiment, the base material has been quenched and tempered so that it includes some martensite. In both embodiments, the base material is relatively easier to initially form and shape. The heat treatment according to the present invention occurs only superficially on the piston ring, so the entire ring is not subjected to heat treatment. In fact, because all of the methods described for heating the surface may be selectively aimed, portions of the surface of the piston ring may be selectively hardened. Thus, the heat treatment may be limited only to the face or contact areas of the piston ring. As a result, the original ductility of the base material is sufficiently maintained to allow conformability of the piston ring with the groove of a piston.

The surface heat treatment also occurs over a relatively short period of time, compared to the time required to heat treat an entire piston ring. By limiting the scope of the heat treatment, the time required to heat treat the piston ring is reduced, resulting in manufacturing efficiencies. Manufacture time is further reduced without adversely affecting the piston ring quality. Finally, because the heat treatment occurs only to a limited depth on the piston ring, only those faces which require hardening need be subjected to the treatment, thereby maintaining the ductility and resiliency of the base material.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
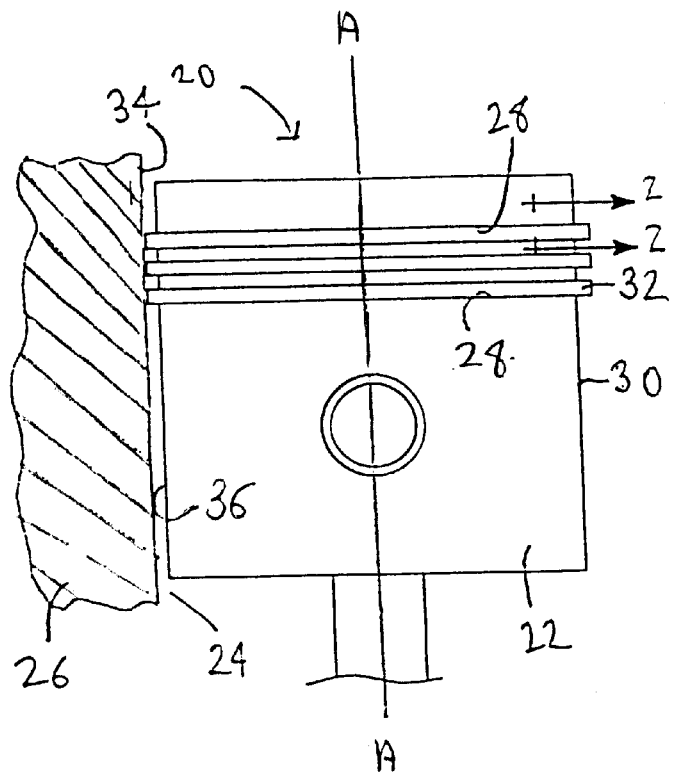
FIG. 1 is a view of a piston for use in an internal combustion engine including several piston rings of the present invention.

A piston assembly 20 is illustrated in FIG. 1 which includes a piston 22 reciprocably movable along a longitudinal axis A—A within a bore 24 of a cylinder 26 of an internal combustion engine. Piston 22 includes a plurality of annular grooves 28 about a circumferentially extending outer peripheral surface 36. A one piece annular piston ring or sealing member 32 is mounted within each of grooves 28 to provide sealing engagement between outer peripheral surface 36 and a corresponding cylinder wall 34.

Figure 2:
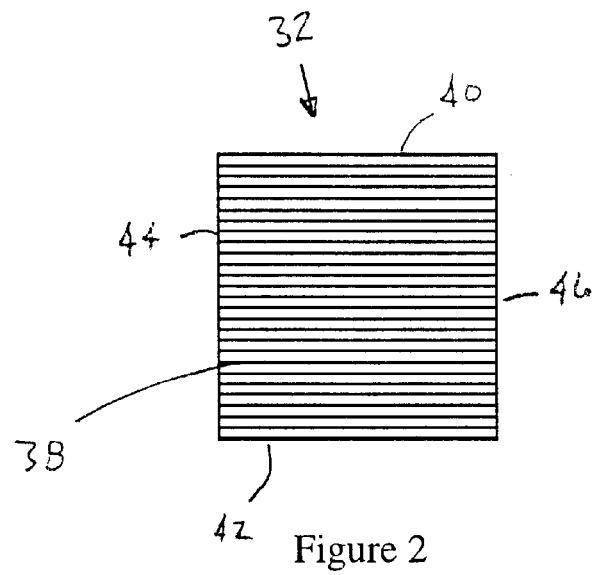
FIG. 2 is a cross-section of a piston ring, taken along lines 2—2 of FIG. 1, showing an untreated piston ring prior to surface hardening according to the present invention.

A first cross-section of an untreated piston ring 32 is illustrated in FIG. 2. Piston ring 32 is shown for simplicity in FIG. 2 as having a square cross-section, but it should be understood that the present invention is effective regardless of the piston ring geometry and cross-sectional shape.

Piston ring 32 starts with a metallic base material 38 of a first hardness. Preferably, base material 38 is either an aluminum-iron alloy, a steel alloy or simply cast iron, but may be formed of any metal having desirable characteristics. In particular, the base metal must be able to transition to both austenite and martensite. Alternatively, the base material 38 may be formed of a quenched and tempered alloy that includes coarse martensite. In such a case, the surface heat treatment transforms the coarse martensite to austenite, and rapid cooling transforms the austenite into fine martensite. In both cases, the base material 38 is relatively ductile and easily workable into the required shape of piston ring 32, either by drawing or stamping or casting. The ductility (i.e. non-rigidity) feature of the base material 38 is necessary to allow the piston ring 32 to conform snugly against the outer peripheral surface 36 of the piston 22.

With reference to both FIGS. 1 and 2, the cross-section of piston ring 32 includes a top surface 40, a bottom surface 42, a radially inner surface 44 and a radially outer surface 46. Upon assembly to the piston 22, the radially inner surface 44 is placed adjacent the radially outer peripheral surface 36 of the piston 22, while the radially outer surface 46 is placed adjacent the cylinder wall 34. During operation, the radially outer surface 46 of the piston ring 32 is subjected to substantial frictional and thermal stress. As a result, it is desirable to harden a thin layer of the material comprising the radially outer surface 46 of the piston ring 32.

Figure 3:
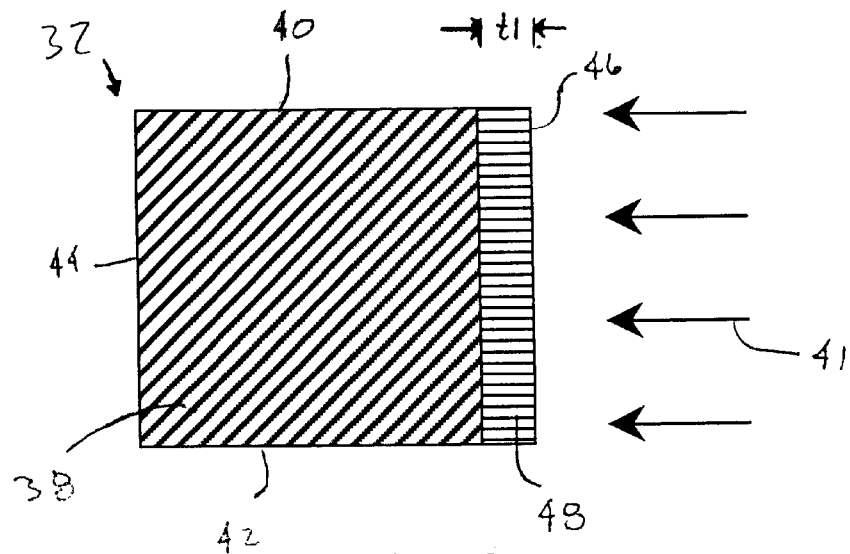
FIG. 3 is a cross-section of a piston ring, taken along lines 2—2 of FIG. 1 showing the inventive piston ring after a secondary layer has been selectively formed on the exterior of the base material by selectively heat treating the surface of the base material.

As seen in FIG. 3, instead of applying a heat treatment to the entire body of piston ring 32, the piston ring 32 is instead selectively and superficially treated. The piston ring is selectively heated to the extent that only a predetermined portion of the exterior surface of the piston ring is subjected to a heat treatment. And the heat treatment process is designed only to affect a small thickness of the base material, thereby having only a superficial effect. As seen in FIG. 3, only the radially outer surface 46 is treated, as it includes the portion of the piston ring 32 that contacts cylinder wall 34 (see FIG. 1) during piston reciprocation. The process of heat treating the radially outer surface 46 involves applying energy, represented by arrows 41, directly to the radially outer surface 46, raising the temperature of the radially outer surface 46 to above the temperature at which austenite forms. The surface is then rapidly cooled in an appropriate environment to form a martensite layer 48 on surface 46. Martensite has the requisite hardness characteristics to withstand the friction and wear while operating as a seal in an internal combustion engine. Preferably, the thickness t1 of the layer 48 is between 25 and 200 $\mu$m thick, and most preferably, is about 100 $\mu$m thick. Since a piston ring is only about 3 mm in width, the heat treatment affects less than ten percent of the thickness of the base material to form the layer 48.

As noted above, the piston ring 32 may include either an untreated metallic base material 38 of a first hardness, or may include a quenched and tempered alloy that includes a coarse matrix of martinsite. When the base material is untreated, heating the layer 48 of the base material transforms the material to austenite, and then the cooling transforms the layer 48 into martensite, which is harder than the austenite. Alternatively, when the base material has already been quenched and tempered to include a coarse matrix of martensite, heating the layer 48 transforms the base material into austenite, and the cooling transforms the austenite into a fine matrix of martensite. The fine matrix of martensite is harder than either the austenite or the coarse matrix of martensite. Thus, the base material is transformed through at least two, and possibly three, separate hardness phases by the application of the heat treatment according to the present invention.

Figure 4:
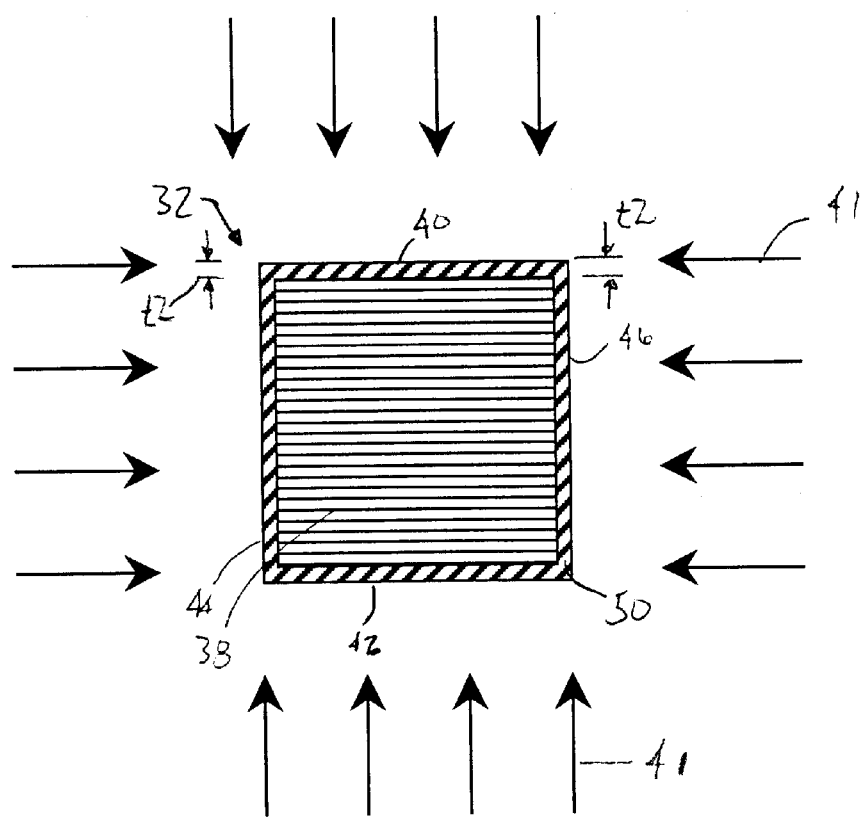
FIG. 4 is an alternative cross-section talen along lines 2—2 of FIG. 1 showing the inventive piston ring after a secondary layer has been formed on the exterior surfaces of the piston ring by heat treating the entire surface of the base material.

Another configuration of the treated piston ring of the present invention is shown in FIG. 4. Instead of selectively applying heat to only one surface 46, a heat treatment method, again represented by arrows 41, is superficially applied to the entire exterior of piston ring 32, including top and bottom surfaces 40 and 42, as well as to both radially inner and outer surfaces 44 and 46. In this way, a hardened martensitic layer 50 is superficially formed on the entire exterior of piston ring 32. As described above, the exterior surface of the piston ring 32 is first heated to a temperature at which austenite forms, and then is rapidly cooled in an appropriate environment to form a layer of martensite. Advantageously, heat treatment of the entire piston ring helps minimize a condition known microwelding. During engine use, the piston/piston ring interface is particularly susceptible to a phenomenon which causes the areas of contact between the piston and the piston ring to literally weld to one another as a result of the pressure and temperature experienced by the contact points. The martensitic layer 50 helps keep the piston ring free to move relative to walls of the piston grooves 28. And because the thickness t2 of the martensitic layer 50 is very small (i.e. 25–200 μm thick), the piston ring 32 retains sufficient ductility to enhance conformability of the piston ring 32 to the piston 22. Therefore, piston groove 28 and piston ring 32 will mate uniformly such that microwelding is minimized while sealing capability is maximized.

According to the present invention, a heat treatment is selectively applied only to the surface of the piston ring. The heating of the surface may be accomplished by any one of several methods, as long as the resulting temperature is sufficient to form austenite on the surface of the piston ring. Upon reaching a temperature sufficient to form austenite, the piston ring is place in an environment that rapidly cools the piston ring, which transforms substantially all of the austenite to martensite. However, a transition zone forms at the interface between the martensite layer and the base material. The transition zone from base material to martensite may include some austenite, though not in any appreciable thickness. Also, the transition from base material to martensite is usually abrupt and may include some austenite when using cast iron as the base material. In one method for heating the surface layer, an electron beam is concentrated and accelerated onto the surface of the piston ring. As the electrons interact with the surface of the piston ring and deceleration, they deposit large quantities of energy into the surface layer of the piston ring, thereby heating the surface layer. In another method, a laser is aimed and concentrated on the surface of the piston ring. Again, interaction of the laser with the surface of the piston ring heats the surface layer of the ring, thereby superficially heating the piston ring. In still another method, the piston ring is placed in an induction furnace that induces an electrical current on the surface of the piston ring, heating the surface. Further, a plasma torch may also be used to superficially heat the surface of the piston ring.

Using any of the methods, a surface of the piston ring 32 is subjected to an elevated temperature and is then rapidly cooled. For example, acceptable results have been obtained by subjecting the radially exterior surface of 280 piston rings to an electron beam for 134 seconds, wherein the electron beam measures 0.4 mm by 21.2 mm and moves at a rate of 2.2 cm per second, and is from a sourch having a power of 350 W–s/cm$_2$. Acceptable results have also been obtained using a laser having an energy of 16 Joules and a cross section of 4 mm by 2 mm moving at 6 meters per minutes. In both cases, the surface temperature of the piston rings reaches about 800° C., and is then allowed to cool at ambient room temperature. However, enhanced cooling methods may be used to increase the conductive and convective cooling of the piston ring after heat treatment. As a result of the selective and superficial heating, followed by rapid cooling, the piston surface is hardened to a hardness range of 800 to 1000 HV, with a 100 gram load applied to measure hardness of a 100 μm thick layer.

Selective and superficial heat treatment according to the present invention allows the treated surface to be hardened sufficiently to withstand the stresses within an engine and to prevent premature piston ring wear and failure. The inventive method allows use of a ductile, non-rigid and easily workable base material 36 so that a tight fit and seal may be maintained by the piston ring. However, heat treatment is selectively and superficially applied to the base material to increase the resistance of the piston ring to high temperatures, corrosion, and frictional interaction with the cylinder walls 34, and if necessary, with the mating surfaces of the piston groove 28. Thus, the heat treatment may be limited only to the face or contact areas of the piston ring, thereby retaining the original ductility of the base material sufficient to allow conformability of the piston ring 32 against a piston 22.

In addition, the time required to selectively and superficially heat treat piston rings is significantly less than the time required to heat treat an entire piston ring. As a result of the present invention, the time required to manufacture a heat treated piston ring is greatly reduced without adversely affecting the quality of the piston ring so produced.

Preferred embodiments of the present invention have been disclosed. A person of ordinary skill in the art would realize, however, that certain modifications would come within the teachings of this invention. Therefore, the following claims should be studied to determine the true scope and content of the invention.

We claim:

1. A piston ring comprising:
   a base material forming a ring, wherein a predetermined portion of a radial outer surface of the ring that contacts an inner wall of a cylinder bore of said base material is selectively transformable between at least first and second material phases, wherein said second material phase is harder than said first material phase, and
   wherein said first material phase defines a first thickness of said base material and said second material phase includes a superficially heated and cooled predetermined portion of said first material phase, wherein said first material phase is a coarse martensitic material, and said second material phase is a fine martensitic material or wherein said first material phase is an austenitic material, and said second phase is a martensitic material.

2. A piston ring as in claim 1, wherein, when said first material phase is an austenitic material, then said martensitic material is one of coarse or fine.

3. A piston ring as in claim 1, wherein said base material is selected from a group consisting of steel alloys, aluminum-iron alloys, and cast iron.

4. A piston ring as in claim 3, wherein said base material has been quenched and tempered.

5. A piston ring as in claim 1, wherein said base material is selectively heat treated on the entire exterior surface thereof.

6. A piston ring as in claim 1, wherein said first thickness has a thickness of between 25 and 200 μm.

7. A piston ring as in claim 6, wherein said first thickness has a thickness of about 100 μm.

8. A piston ring as in claim 7, wherein said second hardness phase has a hardness range of 800 to 1000 HV.

9. A piston ring as in claim 8, wherein said heat is applied by one of a group of methods consisting of induction heating, electron flux, laser, and plasma torch.

10. A piston ring as in claim 1, wherein an austenitic transition zone is formed between said base material and said first thickness.

11. A piston ring comprising:
    a base material forming a ring, said base material having a predetermined radial portion that is selectively transformable between three material phases, said second material phase harder than said first material phase and said third material phase harder than said first and second material phases wherein a first thickness of said base material is transformed from said first material phase to said third material phase by at least one of repetitively superficially heating said base material and cooling said predetermined radial portion of said base material.

12. A piston ring as in claim 11, wherein said first hardenss phase is a coarse martensite, said second hardness phase is austenite, and said third hardness phase is fine martensite.

13. A piston ring as in claim 12, wherein said first thickness has a thickness of between 25 and 200 µm.

14. A piston ring as in claim 13, wherein said first thickness has a thickness of about 100 µm.

15. A piston ring as in claim 14, wherein said second hardness phase has a hardness range of 800 to 1000 HV.

16. A piston ring as in claim 15, wherein said heat is applied by one of a group of methods consisting of induction heating, electron flux, laser or plasma torch.

17. A piston ring as in claim 16, wherein an austenitic transition zone is formed between said base material and said first thickness.

18. A method of superficially and selectively heat treating a piston ring, comprising:

fabricating the piston ring from a base material wherein a predetermined portion of a radial outer surface of the ring is selectively transformable between at least two material phases, a second material phase being harder than a first material phase;

superficially heating said predetermined portion of said base material; and cooling said predetermined portion, wherein said material phase of said predetermined portion is transformed from said first material phase to said second material phase, wherein said first material phase is a course martensitic material, and said second material phase is a fine martensitic material of wherein said first material phase is an austenitic material, and said second phase is martensitic material.

19. The method of claim 18, wherein, when said first material phase is an austenitic material, then said martensitic material is one of coarse or fine.

20. The method of claim 18, wherein said first thickness has a thickness of between 25 and 200 µm.

21. The method of claim 20, wherein said first thickness has a thickness of about 100 µm.

22. The method of claim 18, wherein said heating step is applied by one of a group of methods consisting of induction heating, electron flux, laser or plasma torch.

23. The method of claim 18, herein said third hardness phase has a hardness range of 800 to 1000 HV.

* * * * *